(12) United States Patent
Balasubramanian et al.

(10) Patent No.: US 12,550,087 B2
(45) Date of Patent: Feb. 10, 2026

(54) GROUP SYNCHRONIZATION SIGNALING FOR EFFICIENT COMMUNICATIONS IN SIDELINK SYSTEMS

(71) Applicant: QUALCOMM Incorporated, San Diego, CA (US)

(72) Inventors: Anantharaman Balasubramanian, San Diego, CA (US); Shuanshuan Wu, San Diego, CA (US)

( * ) Notice: Subject to any disclaimer, the term of this patent is extended or adjusted under 35 U.S.C. 154(b) by 346 days.

(21) Appl. No.: 18/318,451

(22) Filed: May 16, 2023

(65) Prior Publication Data

US 2024/0389036 A1    Nov. 21, 2024

(51) Int. Cl.
*H04W 56/00*    (2009.01)
*H04W 24/10*    (2009.01)

(52) U.S. Cl.
CPC ....... *H04W 56/0015* (2013.01); *H04W 24/10* (2013.01)

(58) Field of Classification Search
None
See application file for complete search history.

(56) References Cited

U.S. PATENT DOCUMENTS

2021/0360725 A1* 11/2021 Tang .................... H04W 24/04
2023/0345394 A1* 10/2023 Leon Calvo ...... H04W 56/0015

FOREIGN PATENT DOCUMENTS

WO    2020069182 A1    4/2020
WO    2022025868 A1    2/2022

OTHER PUBLICATIONS

Intel Corporation: "Sidelink Synchronization Enhancements for Wearable and IoT Use Cases", 3GPP TSG RAN WG1 Meeting#90, R1-1712514, 3rd Generation Partnership Project, Mobile Competence Centre, 650, Route Des Luciotes, F-06921 Sophia-Antipolis Cedex, France, vol. RAN WG1, No. Prague, Czech Republic, Aug. 21, 2017-Aug. 25, 2017, Aug. 20, 2017, pp. 1-7, XP051315330, pp. 1-6.
International Search Report and Written Opinion—PCT/US2024/026862—ISA/EPO—Sep. 19, 2024.

* cited by examiner

Primary Examiner — Gary Lafontant

(57) ABSTRACT

A group of user equipment (UEs) for sidelink communications includes a master UE and member UEs. Any of the UE may measure one or more sidelink synchronization signal sources during a configured measurement gap within the sidelink communications with the group of UEs. A member UE may transmit an alternative synchronization source report indicating detected synchronization sources to the master UE. The master UE is configured to determine to change from a first synchronization source to a second synchronization source for sidelink communications with a group of UEs. The master UE is configured to transmit, to the group of UEs, timing assistance information for synchronization with the second synchronization source. The UEs are configured to switch sidelink communications with the group of UEs to the second synchronization source.

30 Claims, 9 Drawing Sheets

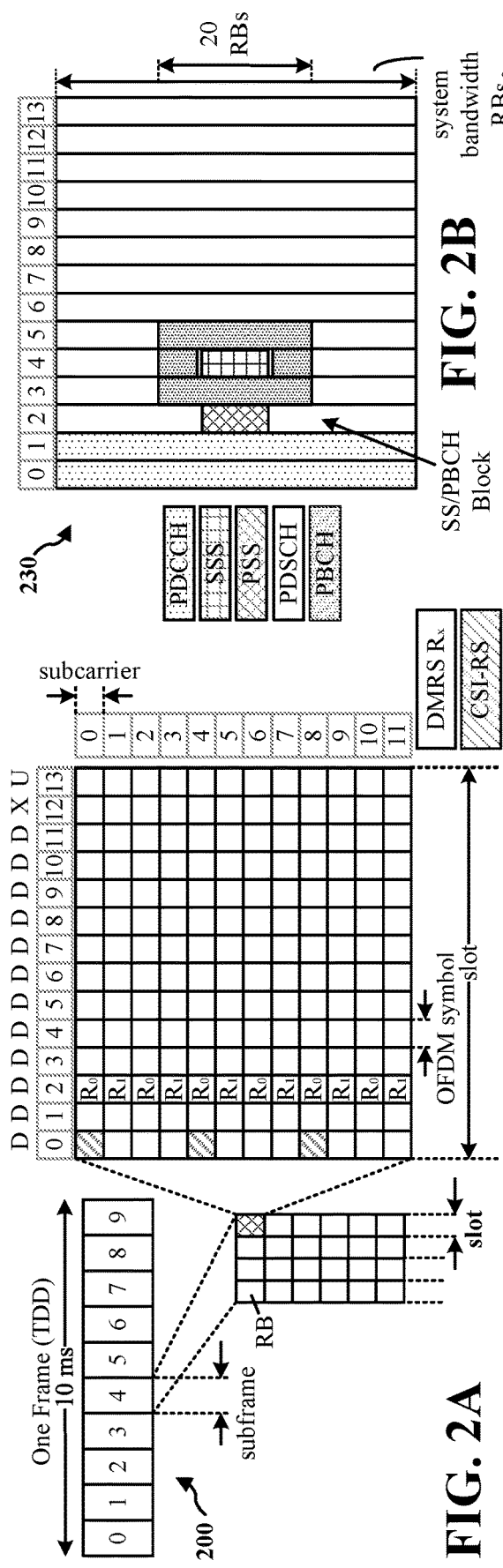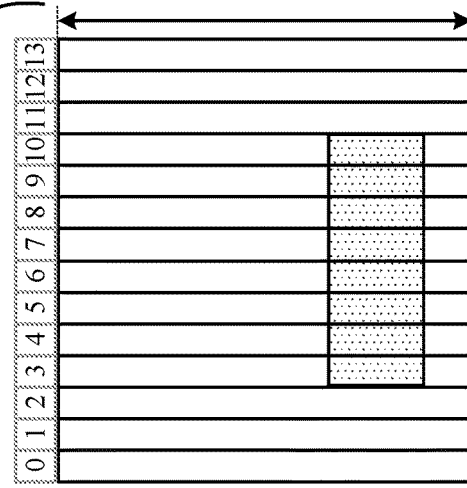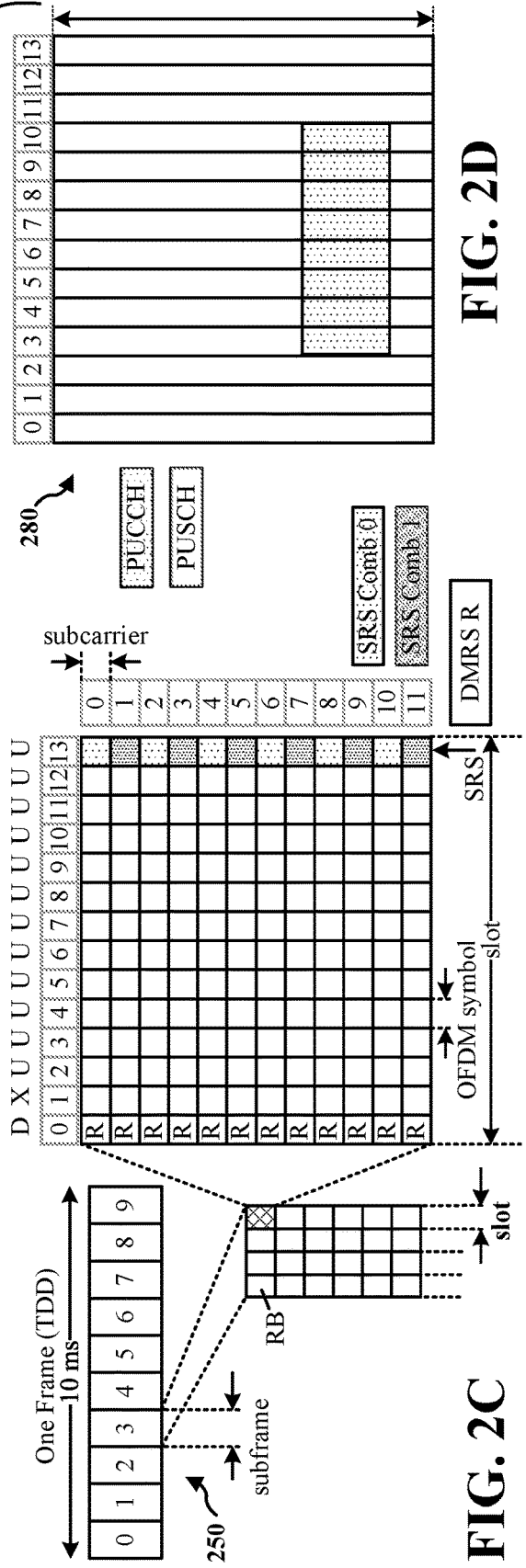

GROUP SYNCHRONIZATION SIGNALING FOR EFFICIENT COMMUNICATIONS IN SIDELINK SYSTEMS

BACKGROUND

Technical Field

The present disclosure relates to wireless communications including group synchronization signaling for sidelink systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method of wireless communication at a user equipment (UE), including: determining to change from a first synchronization source to a second synchronization source for sidelink communications with a group of UEs; transmitting, to the group of UEs, timing assistance information for synchronization with the second synchronization source; and switching sidelink communications with the group of UEs to the second synchronization source.

In some aspects, the techniques described herein relate to a method of wireless communication at a user equipment (UE), including: receiving, from a master UE in sidelink communications with a group of UEs using a first synchronization source, timing assistance information for synchronization with a second synchronization source; and switching sidelink communications with the group of UEs to the second synchronization source.

In some aspects, the techniques described herein relate to an apparatus for wireless communications by a user equipment (UE), including: a transceiver; a memory storing computer-executable instructions; and a processor coupled with the transceiver and the memory and configured to execute the computer-executable instructions to cause the UE to: determine to change from a first synchronization source to a second synchronization source for sidelink communications with a group of UEs; transmit, to the group of UEs, timing assistance information for synchronization with the second synchronization source; and switch sidelink communications with the group of UEs to the second synchronization source.

In some aspects, the techniques described herein relate to an apparatus for wireless communications by a user equipment (UE) including: a transceiver; a memory storing computer-executable instructions; and a processor coupled with the transceiver and the memory and configured to execute the computer-executable instructions to cause the apparatus to: receive, from a master UE in sidelink communications with a group of UEs using a first synchronization source, timing assistance information for synchronization with a second synchronization source; and switch sidelink communications with the group of UEs to the second synchronization source.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of downlink channels within a 5G NR subframe.

FIG. 2C is a diagram illustrating an example of a second 5G NR frame.

FIG. 2D is a diagram illustrating an example of uplink channels within a 5G NR subframe.

DETAILED DESCRIPTION

Figure 1:
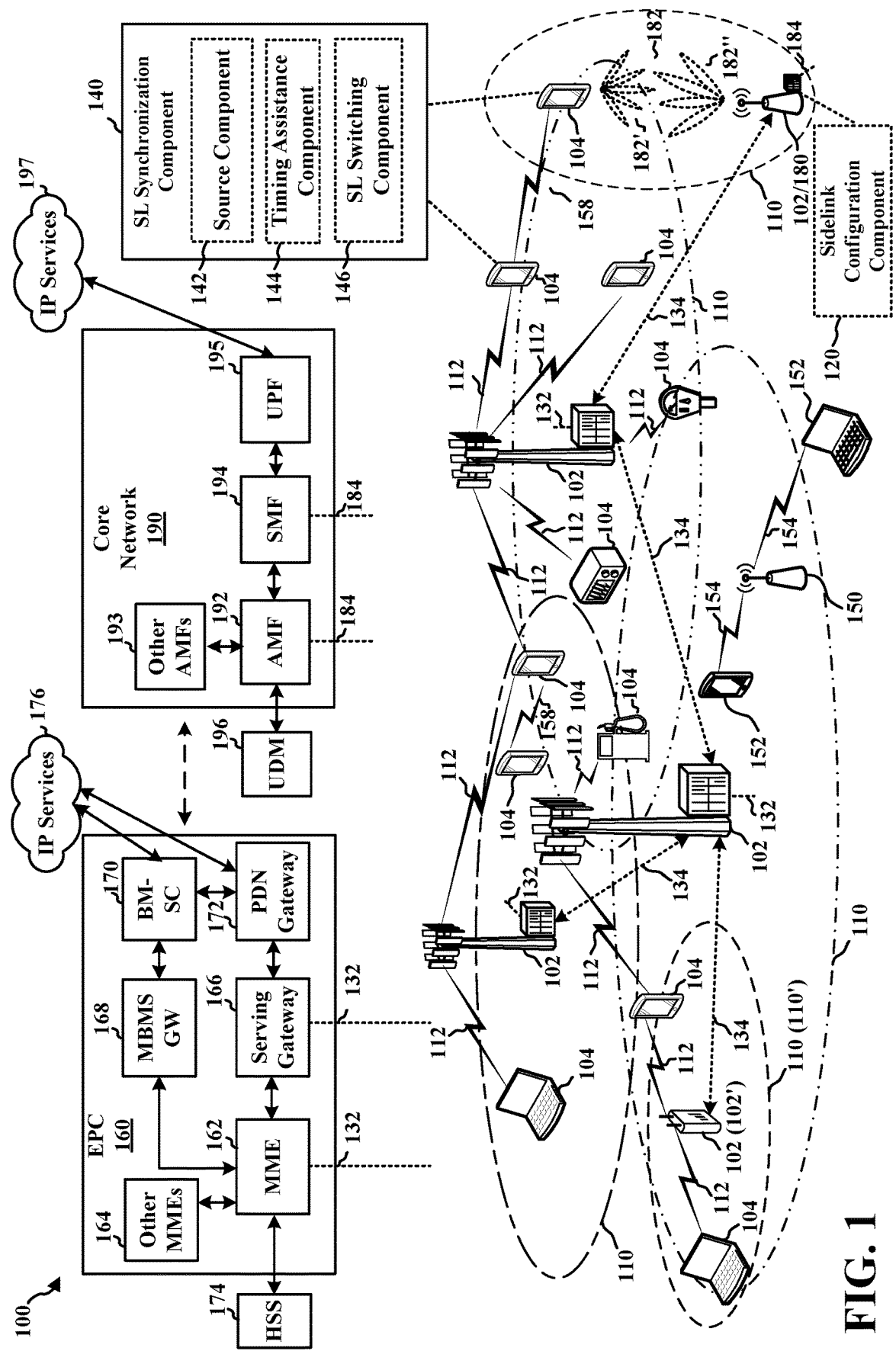
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The described features generally relate to synchronization for sidelink communications, which may also be referred to as direct link communications. As used herein, a direct link refers to a direct wireless communications path from a first wireless device to a second wireless device. For example, in fifth generation (5G) new radio (NR) communication technologies a direct link between two user equipment (UEs) may be referred to as a sidelink (SL), as opposed to communications over the Uu interface (e.g., from gNB to user equipment (UE). Direct links may be utilized in D2D communication technologies that can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a direct link channel.

In an aspect, the described features relate to sidelink communications between a group of UEs when alternative synchronization sources may be present. In V2X communications, a synchronization procedure may address cases when UEs are in coverage, partial coverage, or out of coverage of a mobile network. For example, a priority of synchronization sources may be defined such that higher priority synchronization sources such as a base station (e.g., gNB or eNB) are used in coverage or a global navigation satellite system (GNSS) is used if available. A UE may transmit a sidelink synchronization signal block (SL-SSB) to propagate established timing. A UE may synchronize based on a SL-SSB received from another UE. In some implementations, the priority of SL-SSBs may be based on a received power (e.g., reference signal received power (RSRP) or a number of hops from a higher priority synchronization source. In the case where the UE is out of coverage of a higher priority synchronization source, the UE may generate its own SL-SSB to act as an independent synchronization source.

In some implementations, a SL-SSB may be transmitted in a periodical manner within a time period (e.g., 160 milliseconds (ms)). The SL-SSB may occupy 11 physical resource blocks (PRBs) over a full time slot, which is not used for data channel transmission. In some implementations, a UE that is transmitting an SL-SSB on one resource may receive an SL-SSB in another resource.

In some scenarios, a UE may communicate with a group of UEs via sidelink communications. For example, a vehicle UE (vUE) may be associated with one or more passenger UEs (pUE) as the vUE and pUEs travel together. For instance, the vUE may use sidelink groupcast communications to provide information to the passenger UEs. In such a scenario, the vUE may act as an independent synchronization source by transmitting an SL-SSB, for example, if the vUE is out of coverage of higher priority synchronization sources. The SL-SSB may indicate an out-of-coverage sidelink identity.

In an aspect, when a first vUE comes into contact with a second UE (e.g., receives a SL-SSB from the second UE), the first vUE may be required to synchronize with the second UE if the second UE transmits an SL-SSB indicating an in-coverage sidelink identity. For instance, if the second UE is synchronized with a base station or GNSS, the SL-SSB of the second UE may be a higher priority synchronization source. Several problems may occur in this scenario. First, a communication disruption may occur when the first vUE changes its synchronization source from the independent SL-SSB to the SL-SSB of the second UE. The pUEs in the group may no longer have a synchronization source. Second, the pUEs may incur latency in discovering a new synchronization source. For example, the latency may be based on the periodicity of the SL-SSB of the new synchronization source. Third, the pUEs may generate redundant alternative synchronization sources. For example, if any of the pUEs cannot receive the SL-SSB from the second vUE, the pUEs may transmit an SL-SSB as independent synchronization sources. Eventually, the first vUE may synchronize with the second vUE and transmit a new SL-SSB to propagate the timing of the second vUE. The new SL-SSB may have higher priority than the independent synchronization sources such the pUEs may again synchronize with the first vUE, but these multiple changes of synchronization source may further prolong the communication disruption.

In an aspect, the present disclosure provides for techniques to enhance the distributed synchronization procedure for SL to avoid this scenario where a synchronization reference UE for a cluster suddenly changes its reference synchronization source (e.g. from being an independent synchronization source to now following another synchronization reference UE). A UE that is acting as a synchronization reference UE (e.g., by transmitting an SL-SSB) may inform other UEs in a group for sidelink communications about a second synchronization source before switching to the second synchronization source. The UE may transmit timing assistance information for synchronization with the second synchronization source such that all the UEs in the group can switch to the second synchronization source at the same time, thereby preventing a communication disruption among the group of UEs.

In some implementations, the group of UE may be configured to assist with identifying a synchronization source for the group of UEs. A master UE of the group of UEs may configure the other UEs with an alternative synchronization source measurement gap during which all of the UEs can measure alternative synchronization sources. The UEs may transmit an alternative synchronization source report to the master UE with information about received synchronization signals (e.g., SL-SSB). The master UE may select the second synchronization source to switch to based on the alternative synchronization source reports.

The disclosed SL-SSB related signaling may provide for switching of synchronization sources within a group of UEs in sidelink communication with a reduced or eliminated disruption of communication. Further, the signaling may allow a UE relying on a first synchronization source to quickly switch to a second synchronization source. In some implementations, an alternative synchronization source report may allow a master UE of the group to select a synchronization source that is acceptable for the group.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a SL synchronization component 140 configured to determining to change from a first synchronization source to a second synchronization source for sidelink communications with a group of UEs. The SL synchronization component 140 may include a source component 142 configured to receive an indication of a frequency location of a SL-SSB within a bandwidth part of a shared frequency band. The SL synchronization component 140 may include a timing assistance component 144 configured to transmit, to the group of UEs, timing assistance information for synchronization with the second synchronization source. The SL synchronization component 140 may include a SL switching component 146 configured to switch sidelink communications with the group of UEs to the second synchronization source.

In an aspect, one or more of the UEs 104 (e.g., a second UE) may also include a SL synchronization component 140. The SL synchronization component 140 of the second UE 104 may be configured to receive, from a master UE in sidelink communications with a group of UEs using a first synchronization source, timing assistance information for synchronization with a second synchronization source. The SL synchronization component 140 of the second UE 104 may be configured to switching side communications with the group of UEs to the second synchronization source.

In an aspect, one or more of the base stations 102 may include a sidelink configuration component 120 that is configured to transmit a synchronization signal block that may be used as a synchronization source when the UE is in-coverage of the base station 102. In some implementations, the sidelink configuration component 120 may transmit a synchronization source measurement gap configuration.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. In an aspect, the D2D communication link 158 may be configured with direct link carrier aggregation for a plurality of component carriers.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHZ unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHZ-300 GHZ) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency domain duplex (FDD) in which for a particular set of subcarriers (carrier system bandwidth), subframes within the set of subcarriers are dedicated for either DL or UL, or may be time domain duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 24 slots/subframe. The subcarrier spacing and symbol length/duration are a function of the numerology. The subcarrier spacing may be equal to $2^{\mu}*15$ kHz, where u is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
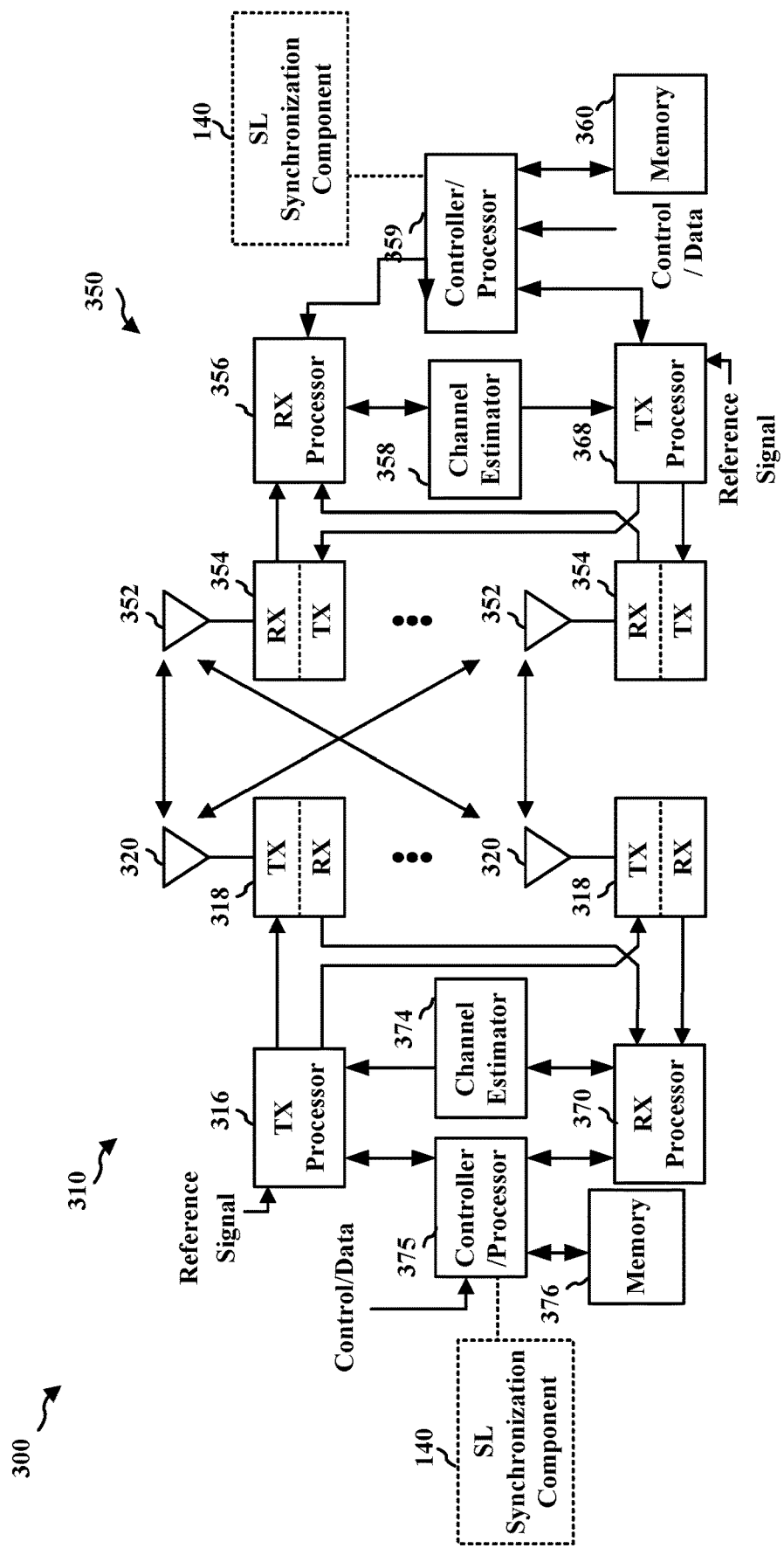
FIG. 3 is a diagram of an example of a first wireless communication device in communication with a second wireless communication device.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a RRC layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be coupled with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be coupled with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the SL synchronization component 140 of FIG. 1. Similarly, at least one of the TX processor 316, the RX processor 370, and the controller/processor 375 may be configured to perform aspects in connection with the SL synchronization component 140 of FIG. 1.

Figure 4:
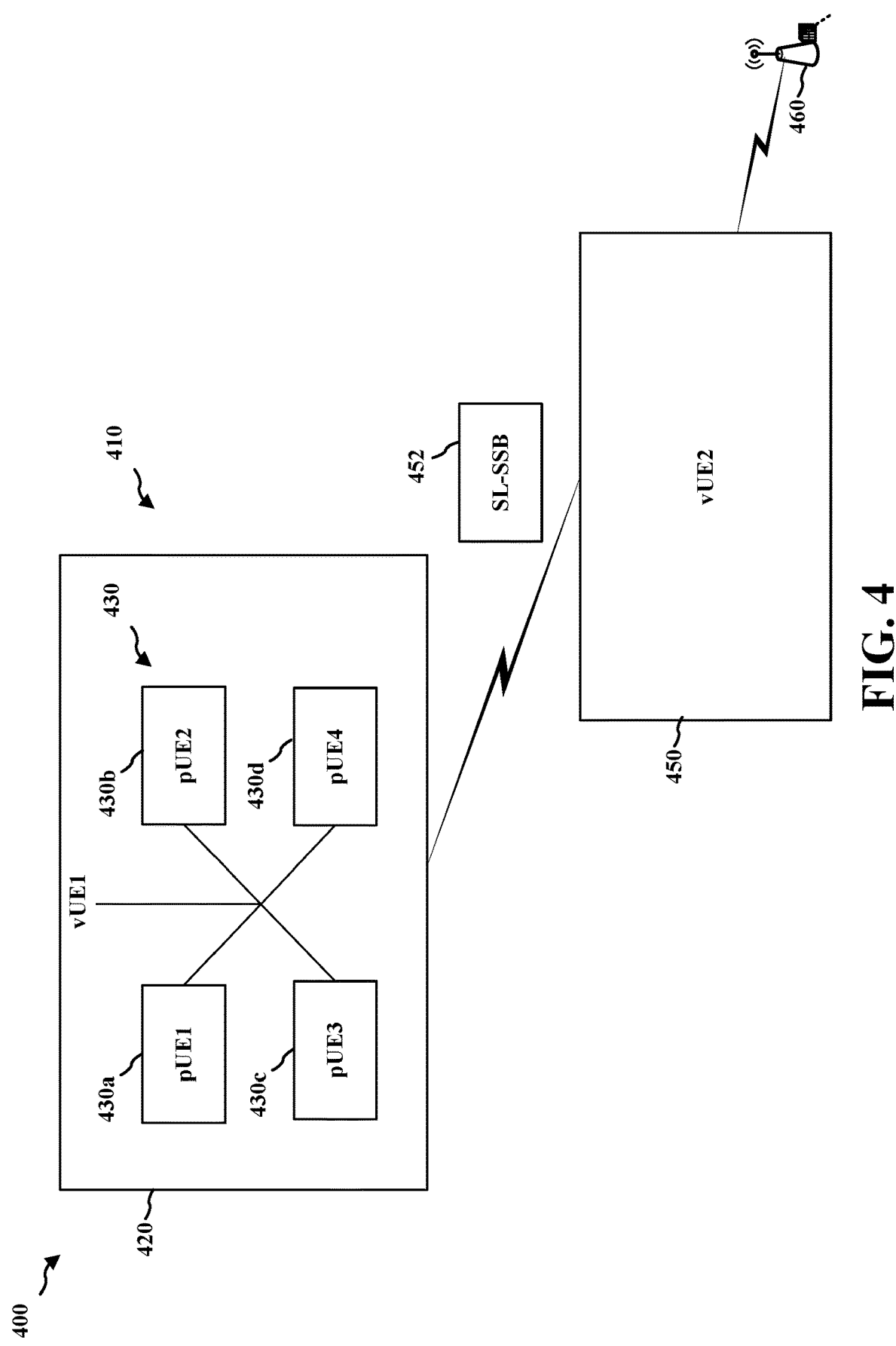
FIG. 4 is a diagram of an example of synchronization for sidelink (SL) communications between a group of UEs.

FIG. 4 is a diagram 400 of an example of synchronization for SL communications between a group of UEs 410. The group of UEs 410 may include, for example, a vehicle UE (vUE) 420 (e.g., vUE1) and one or more passenger UEs (pUEs) 430 (e.g., pUE1 430a, pUE2 430b, pUE3 430c, and pUE4 430d). In some implementations, the vUE 420 may be a master UE of the group of UEs 410. For instance, where the vUE 420 is integrated into a vehicle and the pUEs 430 are located inside of the vehicle, the vUE 420 may have better reception of external signals and serve as a synchronization source for the pUEs 430. It should be appreciated, however, that a group of UEs 410 may not necessarily include different types of UEs, and that any member UE may be selected as the master UE of the group of UEs 410. In some implementations, the master UE may serve as an independent synchronization source for the group of UEs 410. For instance, when the vUE 420 is out of service of any base station or GNSS, the vUE 420 may generate an independent SL-SSB that the pUEs 430 use for sidelink communications.

The group of UEs 410 may participate in a communication session. For instance, the vUE 420 may transmit unicast or groupcast messages to the pUEs 430 via sidelink physical channels (e.g., PSCCH and PSSCH). In some implementations, a higher layer application may facilitate messaging, voice, video, or data communications among the group of UEs 410.

In an aspect, the master UE (e.g., vUE 420) may come into contact with a second UE 450 (e.g., vUE2). For instance, the second UE 450 may transmit a SL-SSB 452 that is received at the vUE 420. In some implementations, one or more of the pUEs 430 may receive the SL-SSB 452.

According to some synchronization rules (e.g., 3GPP Release 16), the SL-SSB 452 may have a higher priority than an independent SL-SSB generated by the vUE 420. For example, the second UE 450 may generate the SL-SSB 452 based on a synchronization signal from a base station 460 or from a GNSS. For instance, the UE 450 may be associated with a different mobile network, may monitor a different frequency band, may be positioned within a different coverage area, or may have better reception than the vUE 420. Due to the higher priority of the SL-SSB 452 as a synchronization source, the vUE 420 may determine to switch to the SL-SSB 452 as a new synchronization source.

If the vUE 420 immediately switches to the SL-SSB 452 as the synchronization source, the pUEs 430 may lose their synchronization source. That is, the vUE 420 may no longer transmit the independent SL-SSB. The pUEs 430b may lose synchronization with the group of UEs 410 and the communication session may be interrupted. In some implementations, each of the pUEs 430 may search for a new synchronization source. In the case where the pUE 430a, for example, does not receive the SL-SSB 452, the pUE 430a may generate a new independent SL-SSB to act as a synchronization source (e.g., for communications with pUE 430b). Accordingly, one or more sub-groups of UEs may be formed that do not include the entire group of UEs 410. Eventually, the vUE 420 may generate a SL-SSB based on the SL-SSB 452, which may be received by the pUEs 430 and have a higher priority. However, the generation of new independent SL-SSBs by the pUEs 430 may be considered redundant and/or wasteful. The present disclosure provides techniques for the group of UEs 410 to switch synchronization timing.

Figure 5:
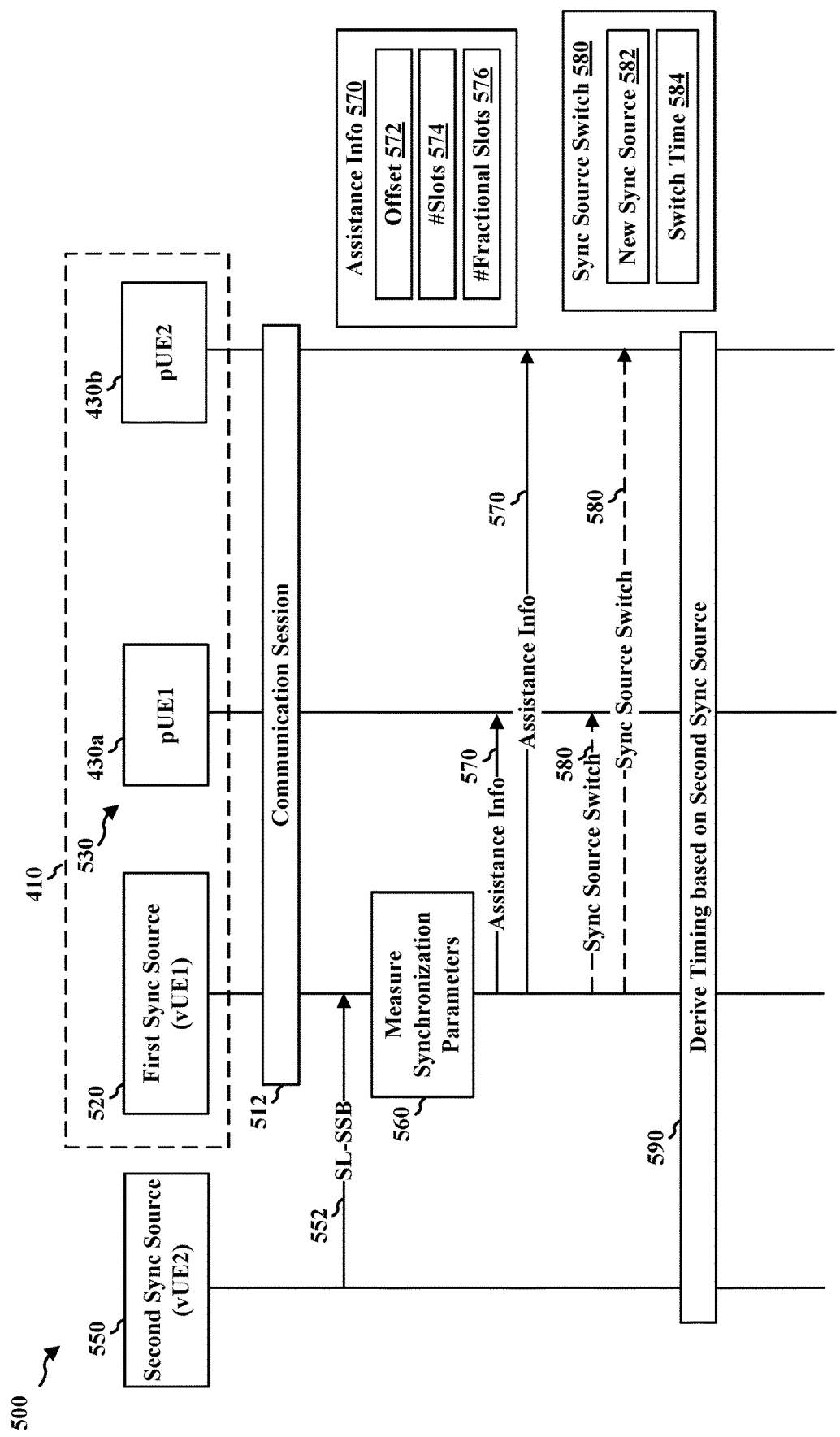
FIG. 5 is a message diagram illustrating example messages for switching a synchronization source for a group of UEs.

FIG. 5 is a message diagram 500 illustrating example messages for switching a synchronization source for the group of UEs 410. The group of UEs 410 may include a first synchronization source 520, which may be the vUE 420, for example. The group of UEs 410 may include one or more member UEs 530 such as the pUEs 430 (e.g., pUE1 430a and pUE2 430b). The group of UEs 410 may participate in a communication session 512.

A second synchronization source 550 may not be part of the group of UEs 410. For example, the second synchronization source 550 may be the second UE 450. The second synchronization source 550 may transmit a SL-SSB 552. The first synchronization source 520 may receive the SL-SSB 552 and measure synchronization parameters at block 560. For example, the first synchronization source may determine a sidelink identifier of the second synchronization source 550, and may determine whether the second synchronization source 550 is in-coverage or out-of-coverage. In some implementations, the first synchronization source 520 may determine that the second synchronization source 550 is a higher priority than the first synchronization source based on the sidelink identifier and/or the in-coverage or out-of-coverage status. Due to the higher priority, the first synchronization source may determine to change from a first synchronization source (e.g., the independent SL-SSB of the first synchronization source 520) to the second synchronization source for sidelink communications with the group of UEs 410.

The first synchronization source 520 may transmit assistance information 570 to the group of UEs 410 for synchronization with the second synchronization source 550. For example, the assistance information 570 may include an offset 572 between a first timing of the first synchronization source and a second timing of the second synchronization source; a number of slots 574 or subframes that the second timing differs from the first timing; or a number of fractional slots 576 timing difference between the first timing and the second timing. For example, the assistance information 570 may be transmitted as a radio resource control (RRC), V2X, or application layer message communicated via unicast or groupcast on a sidelink channel.

In some implementations, the first synchronization source 520 may optionally transmit a synchronization source switch message 580 to the group of UEs 410. The synchronization source switch message 580 may indicate a selection of the second synchronization source (e.g., new sync source 582) and a time of the switching (e.g., switch time 584). The new sync source 582 may be indicated as a sidelink identifier, for example. The switch time 584 may be, for example, a boundary of a slot or sub-frame. The synchronization source switch message 580 may be a lower level message such as a physical layer signal (e.g., a sidelink control information) or a media access control (MAC) control element (CE). In some implementations, the synchronization source switch message 580 may be an RRC message indicating a change in configuration of the SL-SSB At block 590, the group of UEs 410 as well as the second synchronization source 550 may derive timing based on the second synchronization source 550. That is, the group of UEs 410 may switch the timing for sidelink communications to rely on the timing of SL-SSB 552 and/or the timing indicated by the assistance information 570. In an aspect, because each member of the group of UEs 410 changes timing at the same time (e.g., slot boundary), the communication session 512 may continue without significant interruption.

Figure 6:
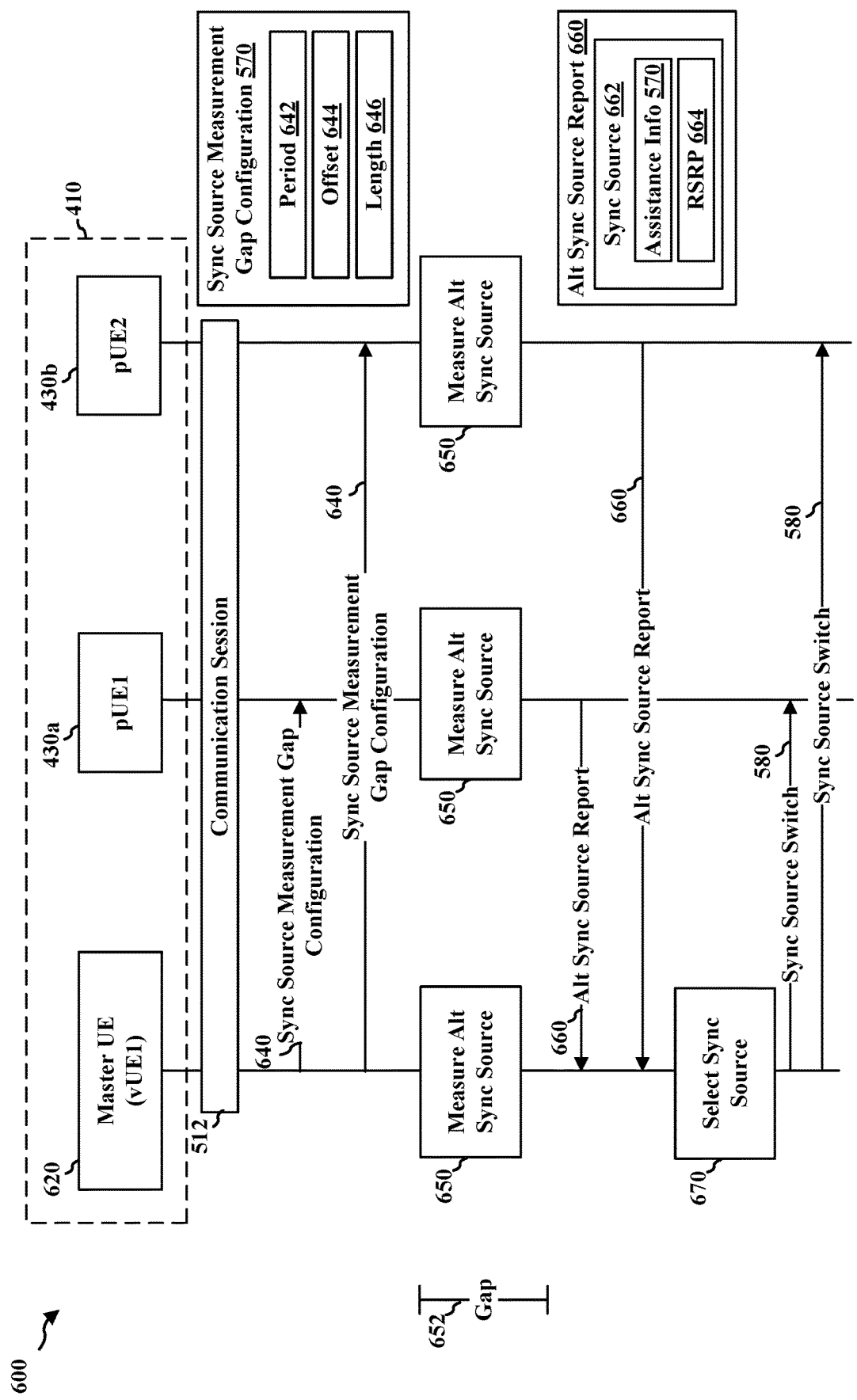
FIG. 6 is a message diagram illustrating example messages for discovering an alternative synchronization source for a group of UEs.

FIG. 6 is a message diagram 600 illustrating example messages for discovering an alternative synchronization source for a group of UEs 410. The group of UEs 410 may include a master UE 620 and member UEs 530 such as the pUEs 430 (e.g., pUE1 430a and pUE2 430b). The group of UEs 410 may participate in the communication session 512.

In an aspect, the master UE 620 (e.g., vUE 420) may transmit a synchronization source measurement gap configuration 640. The synchronization source measurement gap configuration 640 may be transmitted to each of the other UEs (e.g., pUEs 430) as, for example, a unicast or groupcast RRC message or application layer message. The synchronization source measurement gap configuration 640 may define measurement gaps in the communication session 512 for measuring one or more sidelink synchronization signal sources. For instance, the sidelink synchronization signal sources may be on different resources. In some implementations, the synchronization source measurement gap configuration 640 defines the measurement gaps by a measurement gap period 642, a gap offset 644 within a slot or subframe, and a gap length 646.

At block 650, each of the group of UEs 410 may measure alternative synchronization sources. For example, each pUE 430 may attempt to receive a SL-SSB. Each pUE 430 may measure a RSRP 664 of the SL-SSB correspond to the alternative synchronization source.

Each pUE 430 may then transmit an alternative synchronization source report 660 to the master UE 620 and/or the entire group of UEs 410. The alternative synchronization source report 660 may include, for example, a list of synchronization sources 662. For each synchronization source 662, the alternative synchronization source report 660 may include the assistance information 570 and an RSRP 664.

At block 670, the master UE 620 may select the synchronization source. In some implementations, the master UE 620 may select the second synchronization source 550 in response to all of the UEs in the group of UEs 410 indicating the second synchronization source 550 with an RSRP 664 that satisfies a threshold. In some implementations, the master UE 620 may not select an alternate sync source if one or more UEs do not report that the second synchronization source 550 satisfies the threshold. That is, the master UE 620 and/or first synchronization source 520 may continue as the synchronization source. In some implementations, the master UE 620 may select a synchronization source based on a priority, for example, a SL-SSB that indicates in-coverage.

The master UE 620 may transmit a synchronization source switch message 580 to indicate the new synchronization source 582 and the switch time 584.

Figure 7:
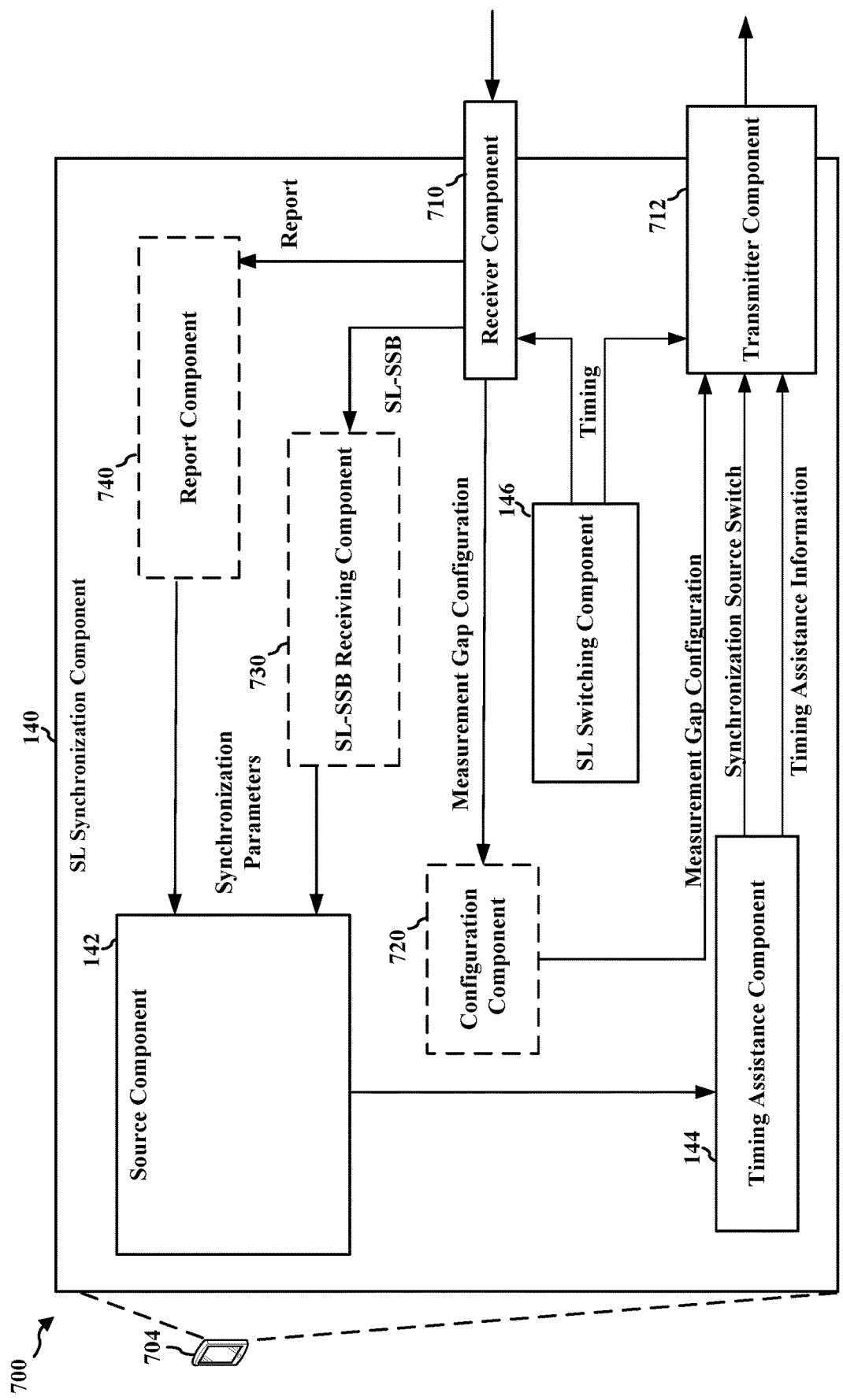
FIG. 7 is a conceptual data flow diagram illustrating the data flow between different means/components in an example UE including a SL synchronization component.

FIG. 7 is a conceptual data flow diagram 700 illustrating the data flow between different means/components in an example UE 704, which may be an example of the UE 104 including the SL synchronization component 140. The SL synchronization component 140 includes the source component 142, the timing assistance component 144, and the SL switching component 146 discussed above with respect to FIG. 1. In some implementations, the SL synchronization component 140 may include a configuration component 720, a SL-SSB receiving component 730, and/or a report component 740.

The UE 704 also may include a receiver component 710 and a transmitter component 712. The receiver component 710 may include, for example, a RF receiver for receiving the signals described herein. The transmitter component 712 may include for example, an RF transmitter for transmitting the signals described herein. In some implementations, the receiver component 710 and the transmitter component 712 may be co-located in a transceiver such as the Tx/Rx 354 in FIG. 3.

The receiver component 710 may receive downlink signals or sidelink signals such as the SL-SSB 552, the assistance information 570, the synchronization source switch message 580, the synchronization source measurement gap configuration 640, and the alternative synchronization source report 660. The receiver component 710 may pass the SL-SSB to the SL-SSB receiving component 730. The receiver component 710 may pass the assistance information 570 and/or the synchronization source switch message 580 to the SL-switching component 146. The receiver component 710 may pass the synchronization source measurement gap configuration 640 to the configuration component 720. The receiver component 710 may pass the alternative synchronization source report 660 to the report component 740.

The configuration component 720 may be configured to transmit or receive the synchronization source measurement gap configuration 640. For example, when the UE 704 is configured as a master UE 620, the configuration component 720 may generate the measurement gap configuration. The configuration component 720 may transmit the synchronization source measurement gap configuration 640 via the transmitter component 712. When the UE 704 is configured as a member of the group of UEs 410, the configuration component 720 may receive the synchronization source measurement gap configuration 640 via the receiver component 710.

The SL-SSB receiving component 730 is configured to receive a SL-SSB 552 from a second synchronization source 550. For example, the SL-SSB receiving component 730 may monitor resources configured for carrying the SL-SSB 552. In some implementations, the SL-SSB receiving component 730 may measure synchronization parameters of the SL-SSB 552. For example, the SL-SSB receiving component 730 may decode the SL-SSB 552 to determine a sidelink identifier and/or in-coverage or out-of-coverage status. The SL-SSB receiving component 730 may also measure a timing difference between the current synchronization source and the second synchronization source 550. When the UE 704 is configured as the master UE 620, the SL-SSB receiving component 730 may provide the measured synchronization parameters to the source component 142. When the UE 704 is configured as a member of the group of UEs 410, the SL-SSB receiving component 730 may provide the measured synchronization parameters to the report component 740.

The report component 740 is configured to receive or transmit an alternative synchronization source report 660. For example, when the UE 704 is configured as the master UE 620, the report component 740 may decode the received alternative synchronization source report 660. The report component 740 may provide the source component 142 with synchronization source parameters such as assistance information 570 and RSRP 664 for each synchronization source included in the alternative synchronization source report 660. When the UE 704 is configured as a member of the group of UEs 410, the report component 740 may generate the alternative synchronization source report 660 based on measurements by the SL-SSB receiving component 730. The report component 740 may transmit the SL-SSB receiving component 730 via the transmitter component 712.

The source component 142 is configured to determine to change from a first synchronization source to a second synchronization source for sidelink communications with a group of UEs. The source component 142 may receive synchronization parameters from the SL-SSB receiving component 730 and/or the report component 740. The source component 142 may select a synchronization source. In some implementations, the source component 142 selects the synchronization source based on a priority. In some implementations, the source component 142 selects a synchronization source in response to a reported RSRP for the synchronization source at each UE in the group of UEs 410 satisfying a threshold. In some implementations, the source component 142 selects the current synchronization source and does not change the synchronization source. The source component 142 may output the selected synchronization source and corresponding synchronization parameters to the timing assistance component 144.

The timing assistance component 144 is configured to transmit, to the group of UEs, timing assistance information for synchronization with the second synchronization source. For example, the timing assistance component 144 may transmit the assistance information 570 via the transmitter component 712. For instance, the timing assistance component 144 may include the synchronization parameters for the selected synchronization source in the timing assistance information 570. In some implementations, the timing assistance component 144 may transmit the synchronization source switch message 580 via the transmitter component 712. For instance, the timing assistance component 144 may include the sidelink identifier for the new synchronization source 582 and the switch time 584 in the synchronization source switch message 580.

The SL switching component 146 is configured to switch sidelink communications with the group of UEs to the second synchronization source. For example, the SL switching component 146 may provide timing information to the receiver component 710 and the transmitter component 712, for example, to define the slots and symbols of the RF resources. In implementations where the UE 704 transmits or receives the synchronization source switch message 580, the SL switching component 146 may switch the synchronization source at the switch time 584.

Figure 8:
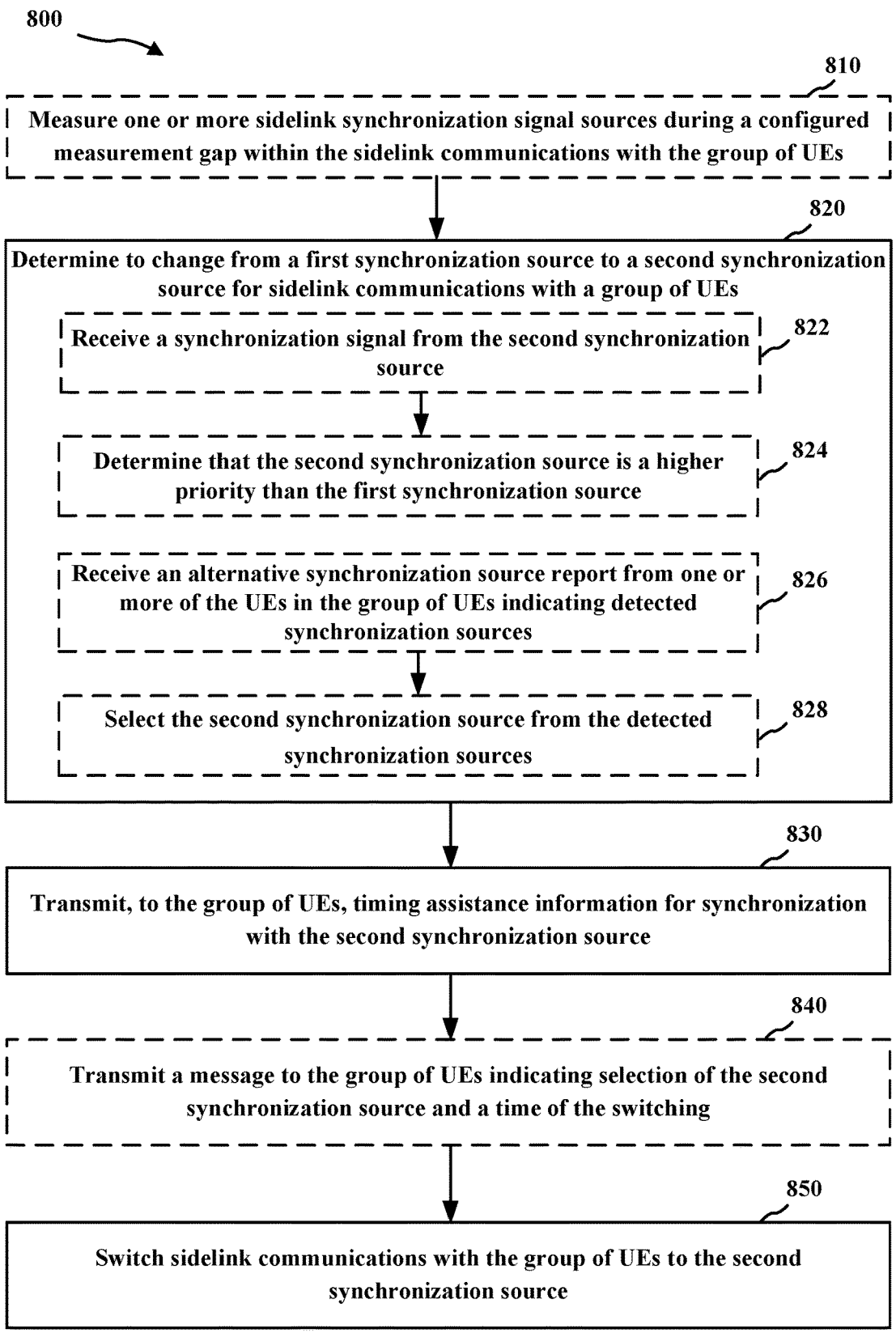
FIG. 8 is a flowchart of an example method for operating a master UE for switching a synchronization source for a group of UEs.

FIG. 8 is a flowchart of an example method 800 for operating a UE 104 (e.g., the first UE 104) for changing a synchronization source for sidelink communications among a group of UEs. The method 800 may be performed by a UE (such as the UE 104, which may include the memory 360 and which may be the entire UE 104 or a component of the UE 104 such as the SL synchronization component 140, the TX processor 368, the RX processor 356, or the controller/processor 359). The method 800 may be performed by the SL synchronization component 140 in communication with a sidelink configuration component 120 of a base station 102 and/or a SL synchronization component 140 of a second UE 104. For example, the UE 104 may perform the method 800 when acting as a master UE 620.

At block 810, the method 800 may optionally include measuring one or more sidelink synchronization signal sources during a configured measurement gap within the sidelink communications with the group of UEs. In an aspect, for example, the UE 104, the RX processor 356 and/or the controller/processor 359 may execute the SL synchronization component 140 and/or the SL-SSB receiving component 730 to measure one or more sidelink synchronization signal sources (e.g., second synchronization source 550) during a configured measurement gap 652 within the sidelink communications (e.g., communication session 512) with the group of UEs 410. Accordingly, the UE 104, the RX processor 356 and/or the controller/processor 359 executing the SL synchronization component 140, the receiver component 710, and/or the SL-SSB receiving component 730 may provide means for measuring one or more sidelink synchronization signal sources during a configured measurement gap within the sidelink communications with the group of UEs.

At block 820, the method 800 includes determining to change from a first synchronization source to a second synchronization source for sidelink communications with a group of UEs. In an aspect, for example, the UE 104, the RX processor 356 and/or the controller/processor 359 may execute the SL synchronization component 140, and/or the source component 142 to determine to change from a first synchronization source 520 to a second synchronization source 550 for sidelink communications with the group of UEs 410. In some implementations, at sub-block 822, the block 820 may optionally include receiving a synchronization signal (e.g., SL-SSB 552) from the second synchronization source 550. As sub-block 824, the block 820 may optionally include determining that the second synchronization source 550 is a higher priority than the first synchronization source 520. In some implementations, at sub-block 826, the block 820 may optionally include receiving an alternative synchronization source report 660 from one or more of the pUEs 430 in the group of UEs 410 indicating detected synchronization sources. In sub-block 828, the block 820 may optionally include selecting the second synchronization source 550 from the detected synchronization sources. Accordingly, the UE 104, the RX processor 356, and/or the controller/processor 359 executing the SL synchronization component 140 and/or source component 142 may provide means for determining to change from a first synchronization source to a second synchronization source for sidelink communications with a group of UEs.

At block 830, the method 800 includes transmitting, to the group of UEs, timing assistance information for synchronization with the second synchronization source. In an aspect, for example, the UE 104, the TX processor 368 and/or the controller/processor 359 may execute the SL synchronization component 140, and/or the SL switching component 146 to transmit, to the group of UEs 410, timing assistance information 570 for synchronization with the second synchronization source 550. Accordingly, the UE 104, the TX processor 368, and/or the controller/processor 359 executing the SL synchronization component 140 and/or SL switching component 146 may provide means for transmitting, to the group of UEs, timing assistance information for synchronization with the second synchronization source.

At block 840, the method 800 may optionally include transmitting a message to the group of UEs indicating selection of the second synchronization source and a time of the switching. In an aspect, for example, the UE 104, the TX processor 368 and/or the controller/processor 359 may execute the SL synchronization component 140, and/or the SL switching component 146 to transmit a message 580 to the group of UEs 410 indicating selection of the second synchronization source (e.g., new synchronization source 582) and a switch time 584 of the switching. Accordingly, the UE 104, the TX processor 368, and/or the controller/processor 359 executing the SL synchronization component 140 and/or SL switching component 146 may provide means for transmitting a message to the group of UEs indicating selection of the second synchronization source and a time of the switching.

At block 850, the method 800 includes switching sidelink communications with the group of UEs to the second synchronization source. In an aspect, for example, the UE 104, the RX processor 356 and/or the controller/processor 359 may execute the SL synchronization component 140, and/or the SL switching component 146 to switch sidelink communications with the group of UEs 410 to the second synchronization source 550. Accordingly, the UE 104, the RX processor 356, and/or the controller/processor 359 executing the SL synchronization component 140 and/or SL switching component 146 may provide means for switching sidelink communications with the group of UEs to the second synchronization source.

Figure 9:
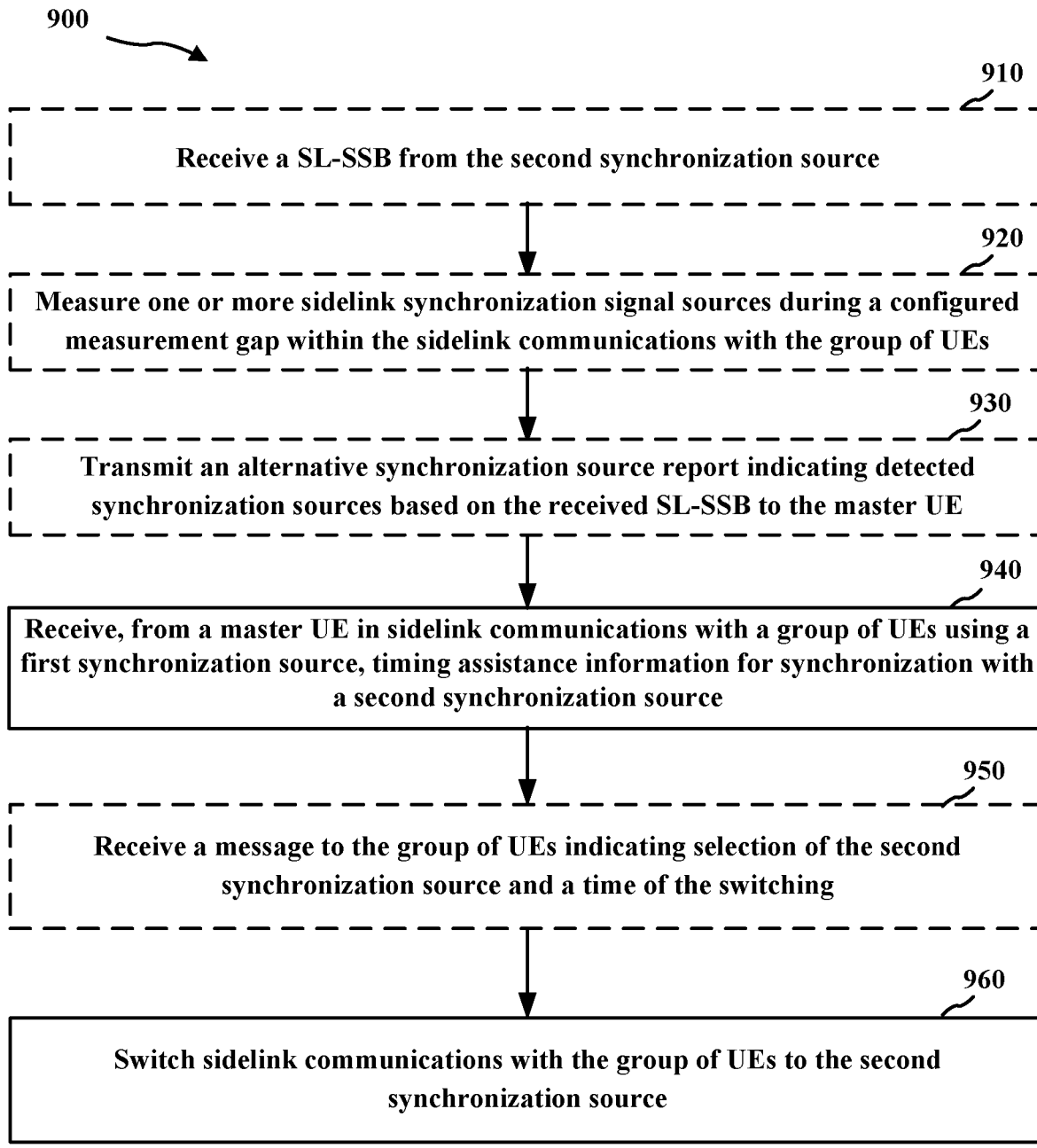
FIG. 9 is a flowchart of an example method for operating a member UE for switching a synchronization source for a group of UEs.

FIG. 9 is a flowchart of an example method 900 for operating a UE 104 (e.g., the first UE 104) for changing a synchronization source for sidelink communications among a group of UEs. The method 900 may be performed by a UE (such as the UE 104, which may include the memory 360 and which may be the entire UE 104 or a component of the UE 104 such as the SL synchronization component 140, the TX processor 368, the RX processor 356, or the controller/processor 359). The method 900 may be performed by the SL synchronization component 140 in communication with a sidelink configuration component 120 of a base station 102 and/or a SL synchronization component 140 of a second UE 104. For example, the UE 104 may perform the method 900 when acting as a member UE (e.g., a pUE 430) of the group of UEs 410.

At block 910, the method 900 may optionally include receiving a SL-SSB from the second synchronization sources. In an aspect, for example, the UE 104, the RX processor 356 and/or the controller/processor 359 may execute the SL synchronization component 140 and/or the SL-SSB receiving component 730 to receive a SL-SSB 552 from the second synchronization sources 550. Accordingly, the UE 104, the RX processor 356 and/or the controller/processor 359 executing the SL synchronization component 140, the receiver component 710, and/or the SL-SSB receiving component 730 may provide means for receiving a SL-SSB from the second synchronization sources.

At block 920, the method 900 may optionally include measuring one or more sidelink synchronization signal sources during a configured measurement gap within the sidelink communications with the group of UEs. In an aspect, for example, the UE 104, the RX processor 356 and/or the controller/processor 359 may execute the SL synchronization component 140 and/or the SL-SSB receiving component 730 to measure one or more sidelink synchronization signal sources (e.g., second synchronization source 550) during a configured measurement gap 652 within the sidelink communications (e.g., communication session 512) with the group of UEs 410. Accordingly, the UE 104, the RX processor 356 and/or the controller/processor 359 executing the SL synchronization component 140, the receiver component 710, and/or the SL-SSB receiving component 730 may provide means for measuring one or more sidelink synchronization signal sources during a configured measurement gap within the sidelink communications with the group of UEs.

At block 930, the method 900 may optionally include transmitting an alternative synchronization source report indicating detected synchronization sources based on the received SL-SSB to the master UE. In an aspect, for example, the UE 104, the TX processor 368 and/or the controller/processor 359 may execute the SL synchronization component 140, and/or the report component 740 to transmit the alternative synchronization source report 660 indicating detected synchronization sources based on the received SL-SSB 552 to the master UE 620. Accordingly, the UE 104, the TX processor 368, and/or the controller/processor 359 executing the SL synchronization component 140 and/or SL switching component 146 may provide means transmitting an alternative synchronization source report indicating detected synchronization sources based on the received SL-SSB to the master UE.

At block 940, the method 900 includes receiving, from a master UE in sidelink communications with a group of UEs using a first synchronization source, timing assistance information for synchronization with a second synchronization source. In an aspect, for example, the UE 104, the RX processor 356 and/or the controller/processor 359 may execute the SL synchronization component 140 and/or the timing assistance component 144 to receive, from a master UE 620 in sidelink communications with a group of UEs 410 using a first synchronization source 520, timing assistance information 570 for synchronization with a second synchronization source 550. Accordingly, the UE 104, the RX processor 356 and/or the controller/processor 359 executing the SL synchronization component 140, the receiver component 710, and/or the timing assistance component 144 may provide means for receiving, from a master UE in sidelink communications with a group of UEs using a first synchronization source, timing assistance information for synchronization with a second synchronization sources.

At block 950, the method 900 may optionally include receiving a message to the group of UEs indicating selection of the second synchronization source and a time of the switching. In an aspect, for example, the UE 104, the RX processor 356 and/or the controller/processor 359 may execute the SL synchronization component 140 and/or the timing assistance component 144 to receive a message to the group of UEs indicating selection of the second synchronization source and a time of the switching. Accordingly, the UE 104, the RX processor 356 and/or the controller/processor 359 executing the SL synchronization component 140, the receiver component 710, and/or the timing assistance component 144 may provide means for receiving a message to the group of UEs indicating selection of the second synchronization source and a time of the switching.

At block 960, the method 900 includes switching sidelink communications with the group of UEs to the second synchronization source. In an aspect, for example, the UE 104, the RX processor 356 and/or the controller/processor 359 may execute the SL synchronization component 140, and/or the SL switching component 146 to switch sidelink communications with the group of UEs 410 to the second synchronization source 550. Accordingly, the UE 104, the RX processor 356, and/or the controller/processor 359 executing the SL synchronization component 140 and/or SL switching component 146 may provide means for switching sidelink communications with the group of UEs to the second synchronization source.

SOME FURTHER EXAMPLE CLAUSES

Implementation examples are described in the following numbered clauses:

Clause 1. A method of wireless communication at a user equipment (UE), comprising: determining to change from a first synchronization source to a second synchronization source for sidelink communications with a group of UEs; transmitting, to the group of UEs, timing assistance information for synchronization with the second synchronization source; and switching sidelink communications with the group of UEs to the second synchronization source.

Clause 2. The method of clause 1, wherein the timing assistance information comprises one or more of: an offset between a first timing of the first synchronization source and a second timing of the second synchronization source; a number of slots or subframes that the second timing differs from the first timing; or a number of fractional slots timing difference between the first timing and the second timing.

Clause 3. The method of clause 1 or 2, wherein determining to change from the first synchronization source to the second synchronization source comprises: receiving a synchronization signal from the second synchronization source; and determining that the second synchronization source is a higher priority than the first synchronization source.

Clause 4. The method of clause 1 or 2, wherein determining to change from the first synchronization source to the second synchronization source comprises: receiving an alternative synchronization source report from one or more of the UEs in the group of UEs indicating detected synchronization sources; and selecting the second synchronization source from the detected synchronization sources.

Clause 5. The method of clause 4, wherein the alternative synchronization source report includes timing assistance information and a reference signal received power (RSRP) of the second synchronization source measured at a respective UE in the group of UEs.

Clause 6. The method of clause 5, wherein selecting the second synchronization source is in response to all of the UEs in the group of UEs indicating the second synchronization source with an RSRP that satisfies a threshold.

Clause 7. The method of any of clauses 1-6, further comprising transmitting a message to the group of UEs indicating selection of the second synchronization source and a time of the switching.

Clause 8. The method of clause 7, wherein the message is a physical layer signal or a media access control (MAC) control element (CE).

Clause 9. The method of any of clauses 1-8, further comprising measuring one or more sidelink synchronization signal sources during a configured measurement gap within the sidelink communications with the group of UEs.

Clause 10. The method of clause 9, wherein the configured measurement gaps are defined by a measurement gap period, a gap offset within a slot or subframe, and a gap length.

Clause 11. The method of clause 9 or 10, wherein a configuration of the configured measurement gap is provided by the first synchronization source or a master UE of the group of UEs.

Clause 12. A method of wireless communication at a user equipment (UE), comprising: receiving, from a master UE in sidelink communications with a group of UEs using a first synchronization source, timing assistance information for synchronization with a second synchronization source; and switching sidelink communications with the group of UEs to the second synchronization source.

Clause 13. The method of clause 12, wherein the timing assistance information comprises on or more of: an offset between a first timing of the first synchronization source and a second timing of the second synchronization source; a number of slots or subframes that the second timing differs from the first timing; or a number of fractional slots timing difference between the first timing and the second timing.

Clause 14. The method of clause 12 or 13, further comprising: receiving a sidelink synchronization block (SL-SSB) from the second synchronization source; and transmitting alternative synchronization source report indicating detected synchronization sources based on the received SL-SSB to the master UE.

Clause 15. The method of clause 14, wherein the alternative synchronization source report includes timing assistance information and a reference signal received power (RSRP) of the second synchronization source measured at a respective UE in the group of UEs.

Clause 16. The method of clause 14 or 14, further comprising receiving a message to the group of UEs indicating selection of the second synchronization source and a time of the switching.

Clause 17. The method of clause 16, wherein the message is a physical layer signal or a media access control (MAC) control element (CE).

Clause 18. The method of any of clauses 14-17, wherein the receiving the SL-SSB is during a configured measurement gap within the sidelink communications with the group of UEs.

Clause 19. The method of clause 18, wherein the configured measurement gaps are defined by a measurement gap period, a gap offset within a slot or subframe, and a gap length.

Clause 20. The method of clause 18 or 19, wherein a configuration of the configured measurement gap is provided by the first synchronization source or the master UE of the group of UEs.

Clause 21. An apparatus for wireless communications by a user equipment (UE), comprising: a transceiver; a memory storing computer-executable instructions; and a processor coupled with the transceiver and the memory and configured to execute the computer-executable instructions to cause the UE to: determine to change from a first synchronization source to a second synchronization source for sidelink communications with a group of UEs; transmit, to the group of UEs, timing assistance information for synchronization with the second synchronization source; and switch sidelink communications with the group of UEs to the second synchronization source.

Clause 22. The apparatus of clause 21, wherein the timing assistance information comprises one or more of: an offset between a first timing of the first synchronization source and a second timing of the second synchronization source; a number of slots or subframes that the second timing differs from the first timing; or a number of fractional slots timing difference between the first timing and the second timing.

Clause 23. The apparatus of clause 21 or 22, wherein to determine to change from the first synchronization source to the second synchronization source, the processor is configured to execute the instructions to cause the apparatus to: receive a synchronization signal from the second synchronization source; and determine that the second synchronization source is a higher priority than the first synchronization source.

Clause 24. The apparatus of clause 21 or 22, wherein to determine to change from the first synchronization source to the second synchronization source, the processor is configured to execute the instructions to cause the apparatus to: receive an alternative synchronization source report from one or more of the UEs in the group of UEs indicating detected synchronization sources; and select the second synchronization source from the detected synchronization sources.

Clause 25. The apparatus of clause 24, wherein the alternative synchronization source report includes timing assistance information and a reference signal received power (RSRP) of the second synchronization source measured at a respective UE in the group of UEs.

Clause 26. The apparatus of any of clauses 21-25, wherein the processor is configured to execute the instructions to cause the apparatus to transmit a message to the group of UEs indicating selection of the second synchronization source and a time of the switching.

Clause 27. The apparatus of any of clauses 21-25, wherein the processor is configured to execute the instructions to cause the apparatus to measure one or more sidelink synchronization signal sources during a configured measurement gap within the sidelink communications with the group of UEs.

Clause 28. An apparatus for wireless communications by a user equipment (UE) comprising: a transceiver; a memory storing computer-executable instructions; and a processor coupled with the transceiver and the memory and configured to execute the computer-executable instructions to cause the apparatus to: receive, from a master UE in sidelink communications with a group of UEs using a first synchronization source, timing assistance information for synchronization with a second synchronization source; and switch sidelink communications with the group of UEs to the second synchronization source.

Clause 29. The apparatus of clause 28, wherein the processor is configured to execute the instructions to cause the apparatus to: receive a sidelink synchronization block (SL-SSB) from the second synchronization source; and transmit alternative synchronization source report indicating detected synchronization sources based on the received SL-SSB to the master UE.

Clause 30. The apparatus of clause 28 or 29, wherein the processor is configured to execute the instructions to cause the apparatus to receive a message to the group of UEs indicating selection of the second synchronization source and a time of the switching.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication at a user equipment (UE), comprising:
    measuring one or more sidelink synchronization signal sources during a configured measurement gap within sidelink communications with a group of UEs;
    determining to change from a first synchronization source to a second synchronization source for sidelink communications with the group of UEs;
    transmitting, to the group of UEs, timing assistance information for synchronization with the second synchronization source; and switching sidelink communications with the group of UEs to the second synchronization source.

2. The method of claim 1, wherein the timing assistance information comprises one or more of:
an offset between a first timing of the first synchronization source and a second timing of the second synchronization source;
a number of slots or subframes that the second timing differs from the first timing; or
a number of fractional slots timing difference between the first timing and the second timing.

3. The method of claim 1, wherein determining to change from the first synchronization source to the second synchronization source comprises:
receiving a synchronization signal from the second synchronization source; and
determining that the second synchronization source is a higher priority than the first synchronization source.

4. The method of claim 1, wherein determining to change from the first synchronization source to the second synchronization source comprises:
receiving an alternative synchronization source report from one or more of the UEs in the group of UEs indicating detected synchronization sources; and
selecting the second synchronization source from the detected synchronization sources.

5. The method of claim 4, wherein the alternative synchronization source report includes timing assistance information and a reference signal received power (RSRP) of the second synchronization source measured at a respective UE in the group of UEs.

6. The method of claim 5, wherein selecting the second synchronization source is in response to all of the UEs in the group of UEs indicating the second synchronization source with an RSRP that satisfies a threshold.

7. The method of claim 1, further comprising transmitting a message to the group of UEs indicating selection of the second synchronization source and a time of the switching.

8. The method of claim 7, wherein the message is a physical layer signal or a media access control (MAC) control element (CE).

9. The method of claim 1, wherein the configured measurement gaps are defined by a measurement gap period, a gap offset within a slot or subframe, and a gap length.

10. The method of claim 1, wherein a configuration of the configured measurement gap is provided by the first synchronization source or a master UE of the group of UEs.

11. A method of wireless communication at a user equipment (UE), comprising:
receiving a sidelink synchronization block (SL-SSB) from a second synchronization source, wherein the receiving the SL-SSB is during a configured measurement gap within the sidelink communications with a group of UEs;
transmitting alternative synchronization source report indicating detected synchronization sources based on the received SL-SSB to a master UE;
receiving, from the master UE in sidelink communications with the group of UEs using a first synchronization source, timing assistance information for synchronization with the second synchronization source; and
switching sidelink communications with the group of UEs to the second synchronization source.

12. The method of claim 11, wherein the timing assistance information comprises on or more of:
an offset between a first timing of the first synchronization source and a second timing of the second synchronization source;
a number of slots or subframes that the second timing differs from the first timing; or
a number of fractional slots timing difference between the first timing and the second timing.

13. The method of claim 11, wherein the alternative synchronization source report includes timing assistance information and a reference signal received power (RSRP) of the second synchronization source measured at a respective UE in the group of UEs.

14. The method of claim 11, further comprising receiving a message to the group of UEs indicating selection of the second synchronization source and a time of the switching.

15. The method of claim 14, wherein the message is a physical layer signal or a media access control (MAC) control element (CE).

16. The method of claim 11, wherein the configured measurement gaps are defined by a measurement gap period, a gap offset within a slot or subframe, and a gap length.

17. The method of claim 11, wherein a configuration of the configured measurement gap is provided by the first synchronization source or the master UE of the group of UEs.

18. An apparatus for wireless communications by a user equipment (UE), comprising:
a transceiver;
a memory storing computer-executable instructions; and
a processor coupled with the transceiver and the memory and configured to execute the computer-executable instructions to cause the UE to:
measure one or more sidelink synchronization signal sources during a configured measurement gap within sidelink communications with a group of UEs;
determine to change from a first synchronization source to a second synchronization source for sidelink communications with the group of UEs;
transmit, to the group of UEs, timing assistance information for synchronization with the second synchronization source; and
switch sidelink communications with the group of UEs to the second synchronization source.

19. The apparatus of claim 18, wherein the timing assistance information comprises one or more of:
an offset between a first timing of the first synchronization source and a second timing of the second synchronization source;
a number of slots or subframes that the second timing differs from the first timing; or
a number of fractional slots timing difference between the first timing and the second timing.

20. The apparatus of claim 18, wherein to determine to change from the first synchronization source to the second synchronization source, the processor is configured to execute the instructions to cause the apparatus to:
receive a synchronization signal from the second synchronization source; and
determine that the second synchronization source is a higher priority than the first synchronization source.

21. The apparatus of claim 18, wherein to determine to change from the first synchronization source to the second synchronization source, the processor is configured to execute the instructions to cause the apparatus to:
receive an alternative synchronization source report from one or more of the UEs in the group of UEs indicating detected synchronization sources; and select the second synchronization source from the detected synchronization sources.

22. The apparatus of claim 21, wherein the alternative synchronization source report includes timing assistance information and a reference signal received power (RSRP) of the second synchronization source measured at a respective UE in the group of UEs.

23. The apparatus of claim 18, wherein the processor is configured to execute the instructions to cause the apparatus to transmit a message to the group of UEs indicating selection of the second synchronization source and a time of the switching.

24. The apparatus of claim 23, wherein the message is a physical layer signal or a media access control (MAC) control element (CE).

25. The apparatus of claim 18, wherein the configured measurement gaps are defined by a measurement gap period, a gap offset within a slot or subframe, and a gap length.

26. The apparatus of claim 18, wherein a configuration of the configured measurement gap is provided by the first synchronization source or a master UE of the group of UEs.

27. An apparatus for wireless communications by a user equipment (UE) comprising:
a transceiver;
a memory storing computer-executable instructions; and
a processor coupled with the transceiver and the memory and configured to execute the computer-executable instructions to cause the apparatus to:
receive a sidelink synchronization block (SL-SSB) from a second synchronization source, wherein the receiving the SL-SSB is during a configured measurement gap within the sidelink communications with a group of UEs;
transmit alternative synchronization source report indicating detected synchronization sources based on the received SL-SSB to a master UE;
receive, from the master UE in sidelink communications with the group of UEs using a first synchronization source, timing assistance information for synchronization with the second synchronization source; and
switch sidelink communications with the group of UEs to the second synchronization source.

28. The apparatus of claim 27, wherein the processor is configured to execute the instructions to cause the apparatus to receive a message to the group of UEs indicating selection of the second synchronization source and a time of the switching.

29. The apparatus of claim 28, wherein the message is a physical layer signal or a media access control (MAC) control element (CE).

30. The apparatus of claim 27, wherein the timing assistance information comprises on or more of:
an offset between a first timing of the first synchronization source and a second timing of the second synchronization source;
a number of slots or subframes that the second timing differs from the first timing; or
a number of fractional slots timing difference between the first timing and the second timing.

* * * * *